United States Patent [19]

Wall

[11] Patent Number: 4,517,759
[45] Date of Patent: May 21, 1985

[54] STOPPER FOR BRAIDED LINE

[75] Inventor: Ronald E. Wall, Voluntown, Conn.

[73] Assignee: Marine Concepts of America, Davisville, R.I.

[21] Appl. No.: 587,509

[22] Filed: Mar. 8, 1984

[51] Int. Cl.³ .............................................. A01N 73/00
[52] U.S. Cl. .............................................. 43/7; 43/14; 87/6; 87/12
[58] Field of Search ........................ 43/7, 8, 9, 10, 11, 43/12, 14; 294/77; 87/6, 8, 12, 13

[56] References Cited

U.S. PATENT DOCUMENTS

| 310,285 | 1/1885 | Johnson | 87/8 |
| 1,781,458 | 11/1930 | Gore | 294/77 |
| 3,024,302 | 3/1962 | Coggeshall | 87/8 |
| 3,140,112 | 7/1964 | Anagnostou | 43/7 |
| 3,158,951 | 12/1964 | Lewis et al. | 43/8 |

Primary Examiner—Nicholas P. Godici
Assistant Examiner—M. Jordan
Attorney, Agent, or Firm—Barlow & Barlow

[57] ABSTRACT

A stopper for a braided line having a core and a braided cover is disclosed, the stopper having a post-like part with an enlarged central section which stopper is adapted to be placed within a braided line extending substantially diametral thereof, the enlarged portion enlarging the diameter of the line so that seizing may be placed on either side thereof, which seizing will not slip.

4 Claims, 5 Drawing Figures

STOPPER FOR BRAIDED LINE

BACKGROUND OF THE INVENTION

The invention pertains to an improvement in a stopper for a braided line which produces a knob-like effect on the line. The line is especially useful in connection with trawl nets used in the fishing industry.

In the past the only form of stopper used in connection with line has been the use of pins that are inserted between the strands of the line, which pins can have a boss or enlargement molded thereabout, or be used in conjunction with an enlarged sleeve through which the pin may pass. Examples of this type of construction are seen in U.S. Pat. Nos. 1,061,252 and 807,225. Particularly in the fishing industry where trawl nets are rigged, the rib line has the trawl net fastened thereto at spaced points. The fastening has consisted of a seizing using smaller line which is passed about the rib line and about the net.

In the past a portion of the seizing is passed through the rib line by using a marlin spike. In spite of this, the seizing slips along the rib line, there being tremendous forces exerted by the trawl net so that the fastening is not of a permanent nature. It is desirable to prevent this slipping along the rib line.

SUMMARY OF THE INVENTION

It is accordingly the main object of this invention to provide an improved stopper for braided lines, and more particularly to provide a stopper about which seizing may be placed which will not slip down the braided line.

The stopper of the prevent invention is particularly arranged for use with a braided line which consists essentially of a core of either a plurality of filamentary lengths or a braided core, with a braided cover surrounding the core. The material that makes up a line of this nature is usually polyamide and as a result is quite smooth on its surface. To provide necessary grip for seizing an object along the length of a braided line, there is provided herein a post-like member having a smooth enlargement centrally thereof. The arrangement is such that by parting the braid of the outer cover, the nose of the stopper may be inserted into the core in which the enlargement is located centrally of the core with a portion of the two ends protruding outwardly of the outer cover. When the stopper is in place, seizing may be wrapped around the braided line on either side of the enlargement, which seizing can grip another object, such as another line, or in the illustrated form a fishing net.

DETAILED DESCRIPTION OF THE PREFERRED EMBODIMENTS

Figure 1:
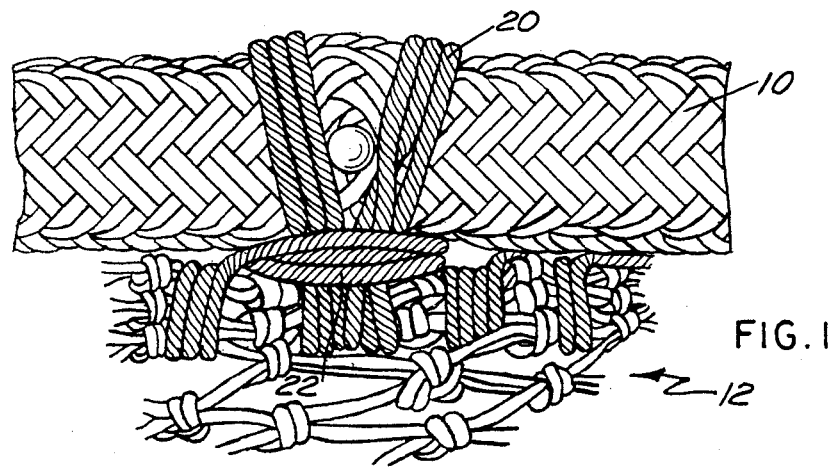
FIG. 1 is a partial elevational view of a section of a braided line having a trawl net seized thereto.

In the accompanying drawings, and referring particularly to FIG. 1, there is illustrated purely for explanatory purposes a braided line 10 herein used as a rib line of a fishing trawl net with a portion of the net also illustrated and generally designated 12. The line 10 is a braided line made in a conventional fashion, as for example in accordance with U.S. Pat. Nos. 3,035,476 and 3,078,755. Essentially a line of this braided configuration consists of a core 14 with an outer covering 16 (see FIG. 3). It is desirable to be able to seize an object on a line such as this, which may well be made of a polyamide and which is inherently slippery. Accordingly, in order to fasten anything, seizing is usually used; and as illustrated in FIG. 1, the seizing will be accomplished by a seizing line 20 which has several turns wrapped around the line 10, and also about the object to be fastened thereto, which in the illustrated embodiment is a net 12; and then several binding turns are usually provided around the bite of the turns to bring them together and to tighten the same, this being seen at the location designated 22.

To eliminate slippage of the seizing along the line, a stopper member generally designated 25 is provided (see FIG. 2), which, in the illustrated form, is a cylindrical post-like member having a cylindrical portion 26 which is provided centrally thereof with an enlarged boss 28. Each end of the post-like member preferably has a smooth blunt nose as at 29, and it will be noted in this particular embodiment that the boss portion 28 is also of a smooth arcuate form on the exterior thereof.

Figure 2:
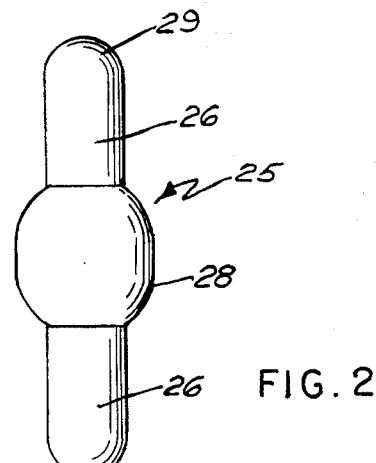
FIG. 2 is a fragmentary elevational view showing a section of braided line with the stopper of the instant invention about to be inserted therein.
Figure 3:
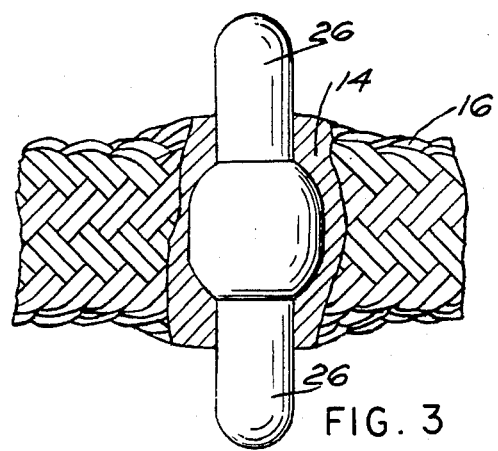
FIG. 3 is a fragmentary view partly in section showing the stopper fully inserted within the braided line.

As seen in FIG. 2, the member is about to be inserted into the body of the line 10, and to this end the braid is separated sufficiently to allow the blunt nose of the stopper to be pushed into the line. When the same is fully inserted it will be in the condition as seen in FIG. 3, with the boss 28 centrally of the line and lying within the core portion 14 thereof and with the tip ends of the post-like portion 26 protruding from either side of the line substantially diametral thereof. Essentially the boss 28 not only engages the braided line, but also prevents the stopper from being dislodged.

Figure 4:
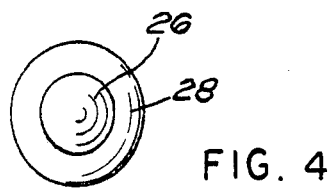
FIG. 4 is an end view thereof.
Figure 5:
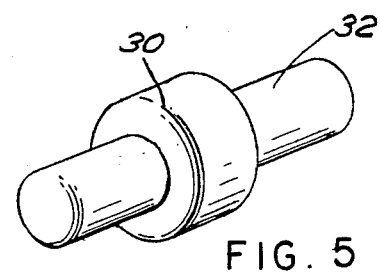
FIG. 5 is a perspective view of the alternate form.

In FIGS. 4 and 5 I have illustrated a slight modification of the stopper arrangement in which the enlargement rather than being of a completely rounded form is seen as an enlarged cylinder 30 that lies about a smaller cylindrical piece 32. In all other respects the arrangement is similar to that as described in connection with the preceding embodiment and operates in substantially the same way, but has certain applications with certain seized and configured lines of the braided variety.

The arrangement disclosed has proven effective in preventing slippage even if the tip of the cylindrical portion is broken off. This comes about since the boss 28 creates an effective enlargement of the braided line over which seizing lines will not slide.

I claim:

1. The method of providing a stopper in a braided line having a core and a braided cover comprising inserting a post-like stopper with a central enlarged portion through the braided cover on one side and into the core with an end protruding substantially diametral of the line on either side thereof whereby the enlargement provided in the line serves as a stopper.

2. The method as in claim 1 including seizing the braided line to another member by winding a seizing line on either side of the stopper and then bending the seizing line about the wound turns.

3. In combination with a braided line having a core and a braided cover surrounding the core, a stopper for said line comprising a post-like member having a central enlargement positioned in the line with the enlargement lying in the core and a portion of the post-like member protruding through interces of the braided cover.

4. The combination of claim 3 wherein the enlargement has a smooth arcuate surface.

* * * * *